United States Patent
Kuniya

(10) Patent No.: US 12,251,891 B2
(45) Date of Patent: Mar. 18, 2025

(54) FIBER FEEDING DEVICE, METHOD OF LAMINATING FIBERS AND METHOD OF MOLDING COMPOSITE MATERIAL

(71) Applicant: SUBARU CORPORATION, Tokyo (JP)

(72) Inventor: Tomoyoshi Kuniya, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 18/150,902

(22) Filed: Jan. 6, 2023

(65) Prior Publication Data
US 2023/0241847 A1   Aug. 3, 2023

(30) Foreign Application Priority Data

Jan. 31, 2022 (JP) .................. 2022-013771

(51) Int. Cl.
*B29C 70/38* (2006.01)
*B29C 65/78* (2006.01)
(Continued)

(52) U.S. Cl.
CPC .......... *B29C 70/388* (2013.01); *B29C 65/787* (2013.01); *B29C 70/06* (2013.01); *B29C 70/304* (2021.05); *B29C 70/545* (2013.01)

(58) Field of Classification Search
CPC ...... B29C 70/384; B29C 70/50; B29C 70/388
See application file for complete search history.

(56) References Cited

U.S. PATENT DOCUMENTS 2,737,859 A * 3/1956 Allison .................. B29C 65/223
 493/203
2,877,607 A * 3/1959 Haracz ................... B24B 7/242
 451/388

(Continued)

FOREIGN PATENT DOCUMENTS

DE   10 2019 109 788 A1   10/2020
JP   H01-247146 A         10/1989
(Continued)

OTHER PUBLICATIONS

Extended European Search Report mailed Jul. 10, 2023 in European Patent Application No. 22213808.3 (5 pages).

*Primary Examiner* — Matthew J Daniels
(74) *Attorney, Agent, or Firm* — Smith, Gambrell & Russell, LLP

(57) ABSTRACT

A fiber feeding device includes rollers, a brake and a belt conveyor. The rollers guide feeding out of tapes. The tapes are arrayed without overlapping the tapes in a width direction. The brake stops first feeding out of a first tape. The belt conveyor feeds out second feeding out of a second tape. The second tape is guided by a selected roller. The second tape is fed out by being sandwiched between the selected roller and the belt conveyor. The selected roller approaches the belt conveyor to sandwich the second tape between the selected roller and the belt conveyor while a nonselected roller retreats from the belt conveyor to prevent a third tape from being sandwiched between the nonselected roller and the belt conveyor. The third tape is guided by the nonselected roller. The third tape includes the first tape.

12 Claims, 9 Drawing Sheets

(51) Int. Cl.
  *B29C 70/06* (2006.01)
  *B29C 70/30* (2006.01)
  *B29C 70/54* (2006.01)

(56) References Cited

U.S. PATENT DOCUMENTS

| | | | | | |
|---|---|---|---|---|---|
| 3,147,166 | A | * | 9/1964 | Friday | B27G 11/00 |
| | | | | | 156/264 |
| 3,212,775 | A | * | 10/1965 | Taylor, Jr. | B31F 1/22 |
| | | | | | 271/197 |
| 3,230,584 | A | * | 1/1966 | Kalwaites | D01G 15/52 |
| | | | | | 19/150 |
| 3,741,453 | A | * | 6/1973 | Pierce | B65H 51/02 |
| | | | | | 226/7 |
| 3,768,752 | A | * | 10/1973 | Bettini | G06K 13/26 |
| | | | | | 242/332.7 |
| 3,819,175 | A | * | 6/1974 | Borostyan | G03G 15/6532 |
| | | | | | 271/197 |
| 3,889,801 | A | * | 6/1975 | Boyer | B65H 5/224 |
| | | | | | 198/689.1 |
| 4,329,315 | A | * | 5/1982 | Brower | B29C 71/02 |
| | | | | | 264/555 |
| 4,531,992 | A | * | 7/1985 | Eaton | B29C 70/545 |
| | | | | | 156/247 |
| 4,894,105 | A | * | 1/1990 | Dyksterhouse | C08J 5/249 |
| | | | | | 156/181 |
| 4,897,146 | A | * | 1/1990 | Inzinna | B29C 66/83431 |
| | | | | | 156/499 |
| 6,170,126 | B1 | * | 1/2001 | Stahlecker | D01H 1/22 |
| | | | | | 19/236 |
| 6,544,367 | B1 | * | 4/2003 | Fujimoto | B65H 35/0013 |
| | | | | | 156/425 |
| 6,585,842 | B1 | * | 7/2003 | Bompard | B29C 70/202 |
| | | | | | 156/273.1 |
| 8,986,482 | B2 | | 3/2015 | McCowin et al. | |
| 2013/0074663 | A1 | * | 3/2013 | Pedigo | B29C 70/384 |
| | | | | | 83/13 |
| 2019/0061279 | A1 | * | 2/2019 | Hou | B32B 3/10 |
| 2021/0129456 | A1 | | 5/2021 | Inagaki et al. | |
| 2021/0206122 | A1 | | 7/2021 | Kawabe et al. | |

FOREIGN PATENT DOCUMENTS

| | | |
|---|---|---|
| JP | 2004-181683 | 7/2004 |
| JP | 2011-527648 | 11/2011 |
| JP | 2020-059145 | 4/2020 |

* cited by examiner

| GROUP | 1 | 2 | 3 | 4 |
|---|---|---|---|---|
| BRAKE | OFF | ON | ON | ON |
| GUIDE ROLLER | ON | OFF | OFF | OFF |

| GROUP | 1 | 2 | 3 | 4 |
|---|---|---|---|---|
| BRAKE | OFF | OFF | ON | ON |
| GUIDE ROLLER | ON | ON | OFF | OFF |

| Process | Group 1 Brake | Group 1 Guide Roller | Group 2 Brake | Group 2 Guide Roller | Group 3 Brake | Group 3 Guide Roller | Group 4 Brake | Group 4 Guide Roller | Cutter | Compaction Roller |
|---|---|---|---|---|---|---|---|---|---|---|
| INITIAL | ON | OFF | ON | OFF | ON | OFF | ON | OFF | OFF | OFF |
| TAPE FEEDING | OFF | ON | OFF | ON | ON | OFF | ON | OFF | OFF | OFF |
| LAMINATING | OFF | OFF | OFF | OFF | ON | OFF | ON | OFF | OFF | ON |
| CUTTING | ON | OFF | ON | OFF | ON | OFF | ON | OFF | ON | ON |
| WAITING | ON | OFF | ON | OFF | ON | OFF | ON | OFF | OFF | ON |
| COMPLETION OF LAMINATION | ON | OFF | ON | OFF | ON | OFF | ON | OFF | OFF | OFF |

FIG. 11

FIBER FEEDING DEVICE, METHOD OF LAMINATING FIBERS AND METHOD OF MOLDING COMPOSITE MATERIAL

CROSS REFERENCES TO RELATED APPLICATIONS

This application is based upon and claims the benefit of priority from Japanese Patent Application No. 2022-013771, filed on Jan. 31, 2022; the entire contents of which are incorporated herein by reference.

FIELD

Implementations described herein relate generally to a fiber feeding device, a method of laminating fibers, and a method of molding a composite material.

BACKGROUND

In order to mold an FRP (fiber reinforced plastic), such as a GFRP (glass fiber reinforced plastic) or a CFRP (carbon fiber reinforced plastic), which is also referred to as a composite material, it is necessary to laminate prepreg sheets consisting of fiber sheets impregnated with uncured resin, and subsequently cure the resin. Alternatively, it is necessary to laminate fiber sheets which have not been impregnated with resin, and subsequently impregnate the laminated fiber sheets with the resin and cure the resin. The method of molding an FRP of impregnating fibers with resin after laminating the fibers is referred to as an RTM (Resin Transfer Molding) method.

In recent years, an AFP (Automated Fiber Placement) apparatus for automatically laminating prepreg tapes or fiber tapes is commercially available, and therefore a prepreg tape as well as a fiber tape, which has not been impregnated with resin, called a dry tape is also commercially available for lamination with an AFP apparatus (for example, refer to Japanese Patent Application Publication JPH01-247146A, Japanese Patent Application Publication JP2004-181683A, and Japanese Patent Application Publication JP2011-527648A).

When tape materials, such as prepreg tapes or dry tapes, are laminated with an AFP apparatus, laminating the tape materials simultaneously can improve the lamination efficiency, i.e., the length of the tape material laminated per unit time. Accordingly, an AFP apparatus having lamination heads is also devised so that tape materials can be laminated simultaneously. In addition, technique for adjusting an overlapped amount between adjacent prepreg tapes is also suggested for a multi-head type AFP apparatus for laminating prepreg tapes simultaneously (for example, refer to Japanese Patent Application Publication JP2020-059145A).

However, in case of changing the total width of laminated tape materials using the conventional AFP apparatus having lamination heads, the overlapped amounts among the tape materials have to be changed. In other words, the total width of laminated tape materials cannot be changed unless the tape materials are partially overlapped with each other. Accordingly, the thickness of laminated tape materials cannot be made uniform.

In addition, when prepreg tapes are overlapped with each other to be laminated, it may become difficult to laminate the prepreg tapes along a curved line since each prepreg tape has the viscosity. Specifically, when prepreg tapes are tried to be laminated along a curved line with overlapping the prepreg tapes with each other, the prepreg tapes may not be laid ideally since the length of a prepreg tape laminated on the inner side differs from that on the outer side. Accordingly, when prepreg tapes are overlapped with each other to be laminated, the prepreg tapes have to be laminated linearly or along a curved line whose curvature is very small.

This applies to a case where the width of the tape material itself is large. That is, in order to laminate tape materials along a curved line whose curvature is large, it is necessary to laminate tape materials whose widths are narrow without overlapping the tape materials with each other. The narrower the widths of tape materials are, the more the lamination efficiency of the tape materials decreases. Therefore, in order to avoid or reduce a decrease in the lamination efficiency, laminating more tape materials simultaneously is required.

However, a typical AFP apparatus has a lamination head composed of a brake for fixing a tape material, a feed roller for feeding out a tape material, a cutter for cutting a tape material, and a compaction roller for pushing a tape material on a mold. The widths of these components of the lamination head are each larger than the width of a tape material. Accordingly, lamination heads cannot be arrayed in the width direction of tape materials in order to avoid interference among the components. That is, lamination heads whose number is the same as that of tape materials have to be arranged at positions different from each other in the feeding direction of the tape materials like arranging the lamination heads alternately. As a result, feeding many tape materials simultaneously requires a large-scale AFP apparatus having many lamination heads, and therefore it is not easy to increase the number of tape materials.

Accordingly, an object of the present invention is to allow laminating tape materials, such as prepreg tapes or dry tapes, used as material of an FRP simultaneously without overlapping the tape materials with each other as well as to allow changing the total width of laminated tape materials.

Moreover, another object of the present invention is to allow laminating more tape materials by an AFP apparatus without a complicated and large-scale lamination head.

SUMMARY OF THE INVENTION

In general, according to one implementation, a fiber feeding device includes rollers, at least one brake and a belt conveyor. The rollers guide feeding out of tapes each made of fiber or prepreg. The tapes are arrayed without overlapping the tapes with each other in a width direction. The at least one brake stops first feeding out of at least one first tape out of the tapes when the at least one first tape of which the first feeding out should be stopped is designated. The belt conveyor feeds out second feeding out of at least one second tape selected out of the tapes when at least one roller which does not guide the at least one first tape is selected from the rollers. The at least one second tape is guided by the at least one selected roller. The at least one second tape is fed out by being sandwiched between the at least one selected roller and the belt conveyor. The at least one selected roller approaches the belt conveyor to sandwich the at least one second tape between the at least one selected roller and the belt conveyor while at least one roller nonselected from the rollers retreats from the belt conveyor to prevent at least one third tape out of the tapes from being sandwiched between the at least one nonselected roller and the belt conveyor. The at least one third tape is guided by the at least one nonselected roller. The at least one third tape includes the at least one first tape.

Further, according to one implementation, a fiber feeding device includes a roller and a belt conveyor. The roller guides feeding out of a tape made of fiber or prepreg. The belt conveyor feeds out the tape by sandwiching the tape between the roller and the belt conveyor. The belt conveyor includes a belt and a suction chuck. The belt has holes. The suction chuck sucks air through the holes of the belt. The suction chuck sucks the tape to prevent the tape from being misaligned in a width direction of the tape.

Further, according to one implementation, a method of laminating fibers includes producing a tape laminated body by laminating the tape fed out by the above-mentioned fiber feeding device.

Further, according to one implementation, a method of molding a composite material includes molding the composite material using the tape laminated body produced by the above-mentioned method.

BRIEF DESCRIPTION OF THE DRAWINGS

In the accompanying drawings:

FIG. 11 shows an example of control states of the AFP apparatus including the fiber feeding device in case of laminating one ply by feeding out only the two tapes, belonging to the first group shown in FIG. 1, and the two tapes, belonging to the second group, from the fiber feeding device to the compaction roller;

DETAILED DESCRIPTION

A fiber feeding device, a method of laminating fibers, and a method of molding a composite material according to implementations of the present invention will be described with reference to the accompanying drawings.

(First Implementation)

(Structure and Function of a Fiber Feeding Device)

Figure 1:
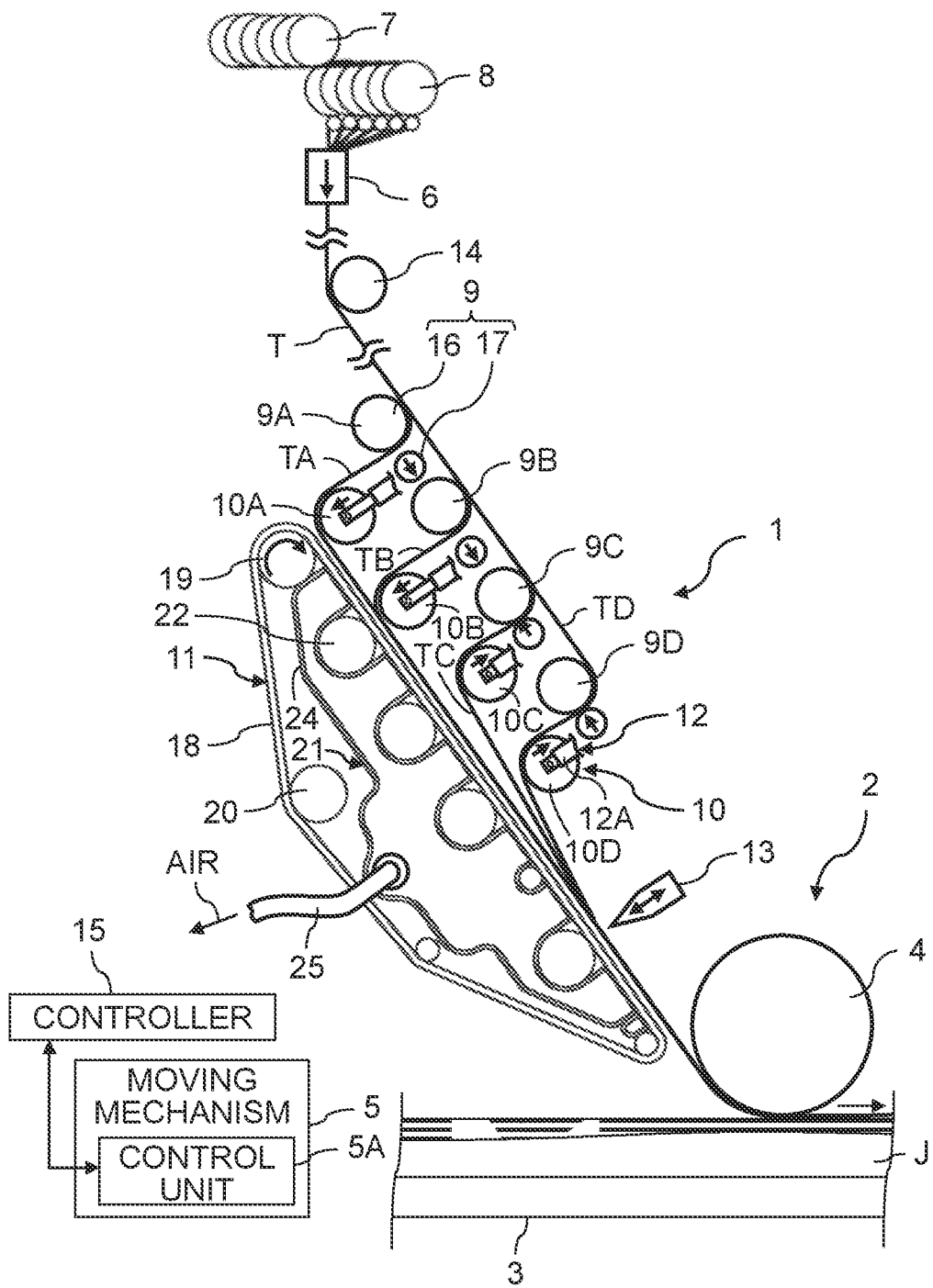
FIG. 1 is a front view showing structure of a fiber feeding device according to the first implementation of the present invention.
Figure 2:
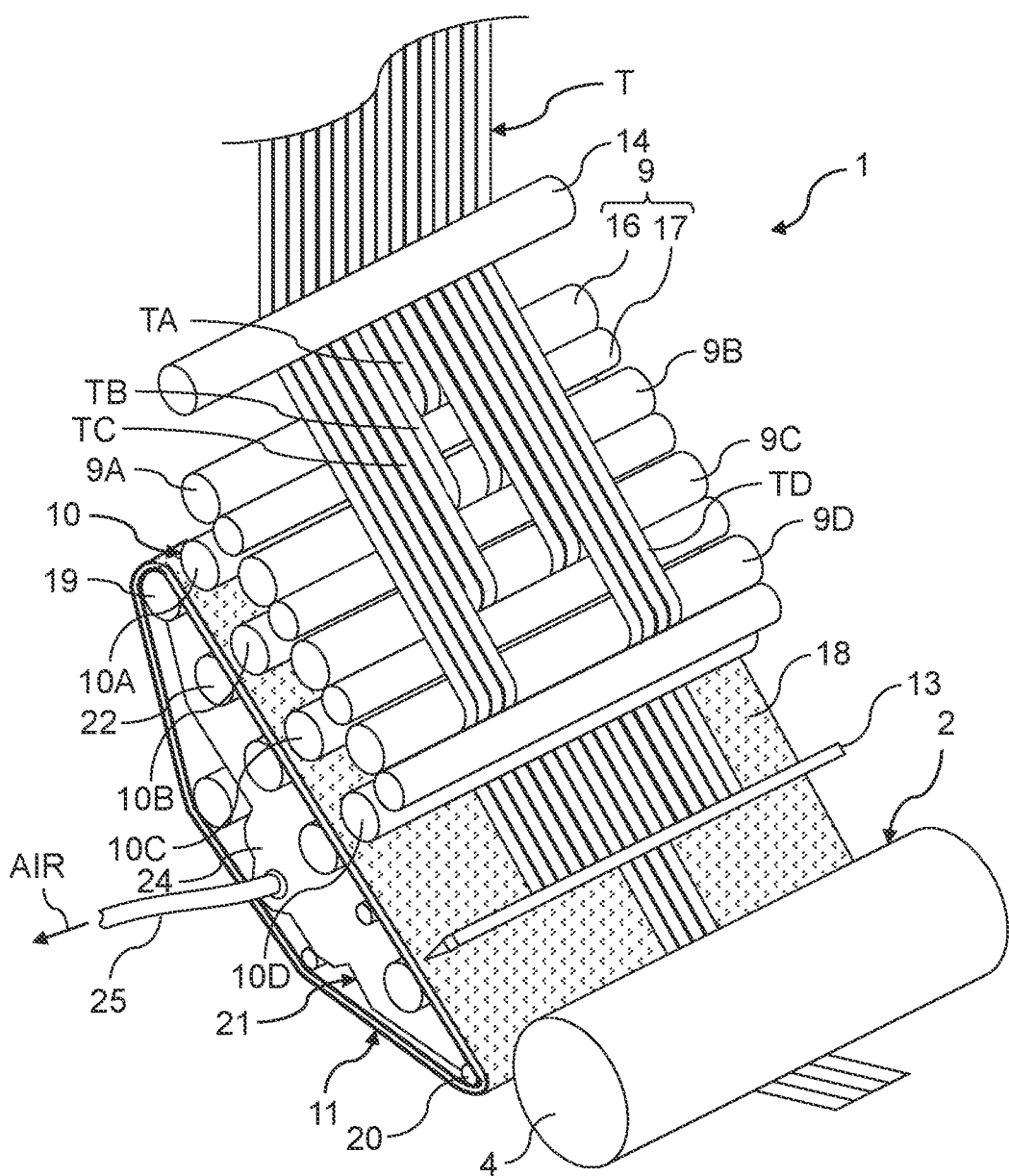
FIG. 2 is a perspective view of main elements of the fiber feeding device shown in FIG. 1.

FIG. 1 is a front view showing structure of a fiber feeding device according to the first implementation of the present invention, and FIG. 2 is a perspective view of main elements of the fiber feeding device shown in FIG. 1.

The fiber feeding device 1 selects at least one desired tape T from previously arrayed tapes T without overlapping the tapes T with each other in the width direction of the tapes T, and then feeds out only the selected at least one desired tape T. Each tape T to be fed out by the fiber feeding device 1 is made of fibers or prepreg, which is material of an FRP. That is, the tapes T are prepreg tapes or dry tapes. A prepreg tape is prepreg, consisting of fibers impregnated with resin, in the form of a tape. A dry tape is fibers, which have not been impregnated with resin, in the form of a tape.

An FRP can be molded by laminating prepreg tapes to produce a laminated body of the prepreg tapes, and subsequently, curing resin included in the laminated body of the prepreg tapes. Alternatively, an FRP can also be molded by an RTM method in which dry tapes are laminated into a laminated body of the dry tapes, and subsequently, the laminated body of the dry tapes is impregnated with resin and the resin is cured.

Therefore, the fiber feeding device 1 can be built in a lamination head of an AFP apparatus 2 which automatically laminates the tapes T. In other words, the fiber feeding device 1 can be attached to the lamination head of the AFP apparatus 2 as an attachment.

The AFP apparatus 2 includes a table 3 for laminating the tapes T, a compaction roller 4 for pushing the tapes T towards the table 3, and a moving mechanism 5 for moving the compaction roller 4 relatively to the table 3. When the lower surface of the tapes T is not flat, a jig J, such as a lower mold, may be placed on the table 3 so that the tapes T can be laminated on the jig J, as exemplified by FIG. 1.

When the compaction roller 4 is moved relatively to the table 3 in a state where the tape T or the tapes T selected by the fiber feeding device 1 have been pushed on the table 3 side by the compaction roller 4, the tape T or the tapes T can be fed out in a direction opposite to the moving direction of the compaction roller 4 while giving tension to the tape T or the tapes T. Therefore, the moving mechanism 5 of the AFP apparatus 2 is configured to move at least one of the table 3 and the compaction roller 4. When the compaction roller 4 is moved by the moving mechanism 5, the whole lamination head including the compaction roller 4 may be moved relatively to the table 5.

In order to feed out the tapes T from the compaction roller 4 toward the table 3, it is necessary to move the compaction roller 4 relatively to the table 3 in direction opposite to a feeding direction of the tapes T. In order to feed out the tapes T from the compaction roller 4 along a curved line, it is necessary to rotate the compaction roller 4 relatively to the table 3. It is also necessary to move the compaction roller 4 relatively to the table 3 in the thickness direction of the tapes T since the thickness of the laminated body of the tapes T increases during the lamination as the tapes T are laminated on the table 3.

Therefore, the moving mechanism 5 is configured to not only linearly move the compaction roller 4 relatively to the table 3 in three axis directions orthogonal to each other but rotate the compaction roller 4 relatively to the table 3. In order to move the compaction roller 4 relatively to the table 3 in the thickness direction of the tapes T, the whole lamination head may be moved, or only the compaction roller 4 may be moved without moving the lamination head.

In order to laminate the tape T or the tapes T by the AFP apparatus 2 as described above, the tape T or the tapes T to be laminated have to be fed out to the compaction roller 4. Therefore, the tape T or the tapes T selected from the arrayed tapes T by the fiber feeding device 1 are fed out towards the compaction roller 4 included in the lamination head of the AFP apparatus 2.

The tapes T supplied to the fiber feeding device 1 have been arrayed so that the tapes T may not be overlapped with each other in the width direction. Therefore, when at least two tapes T are selected to be fed out, the selected tapes T are also fed out in a state where the selected tapes T are arrayed so that the selected tapes T may not be overlapped with each other in the width direction. Accordingly, the tapes T fed out from the fiber feeding device 1 are simultaneously pushed by the common and single compaction roller 4. In other words, the AFP apparatus 2 includes the single lamination head having the compaction roller 4.

Note that, when the tapes T are allowed to be laminated with a clearance gap or clearance gaps, i.e., when the width of an area in which the tapes T should be laminated is wider than the sum total of the widths of the tapes T fed out towards the table 3 from the AFP apparatus 2 including the fiber feeding device 1, the tapes T may be fed out with a clearance gap or clearance gaps from the fiber feeding device 1 towards the compaction roller 4. Henceforth, explanation will be given for an example of case where the tapes T are fed out without any clearance gap and overlap unless extents of the clearance gap and overlap are negligible errors when the tapes T are simultaneously fed out from the fiber feeding device 1.

Figure 3:
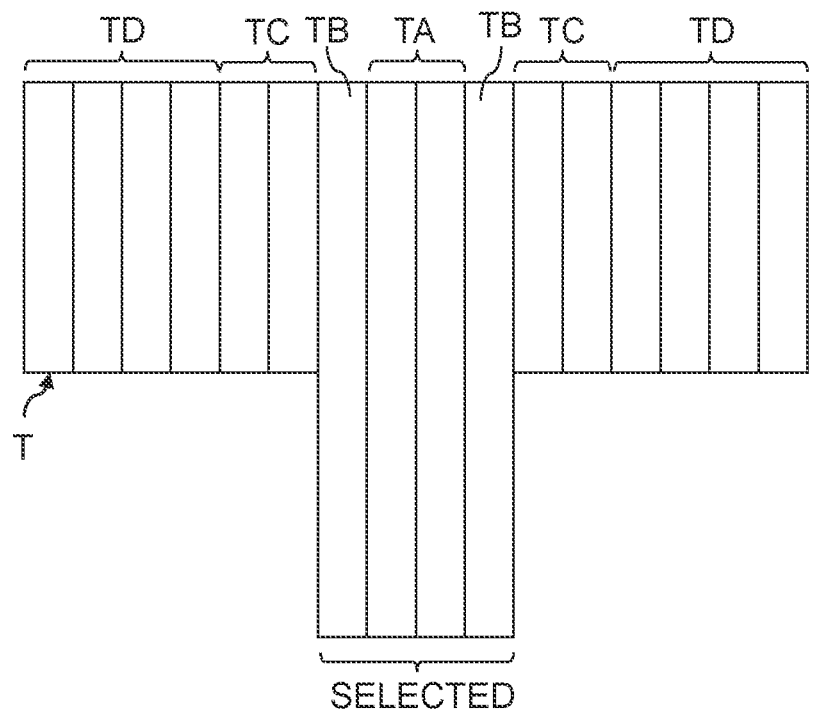
FIG. 3 shows an example of the partial tapes selected from the arrayed tapes supplied to the fiber feeding device shown in FIG. 1.
Figure 4:
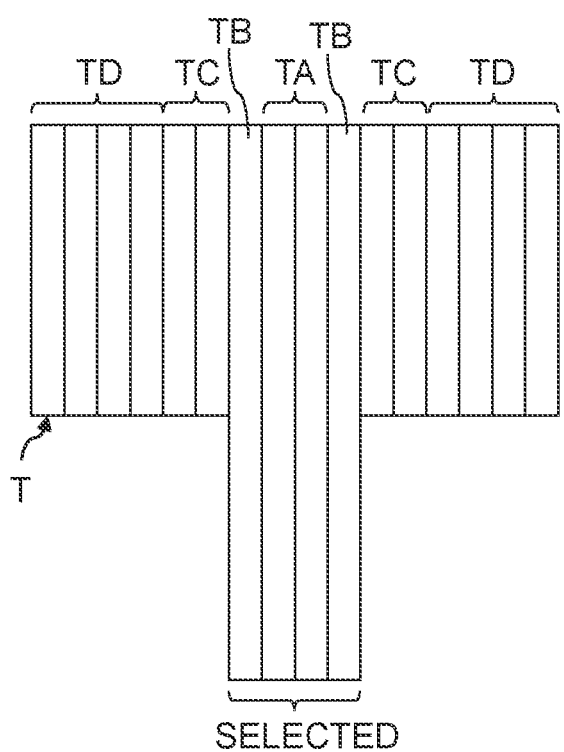
FIG. 4 shows an example of the partial tapes selected from the arrayed tapes supplied to the fiber feeding device shown in FIG. 1.

FIG. 3 and FIG. 4 each shows an example of the partial tapes T selected from the arrayed tapes T supplied to the fiber feeding device 1 shown in FIG. 1.

The tapes T having desired widths can be supplied to the fiber feeding device 1. Accordingly, when the wide tapes T are supplied to the fiber feeding device 1 as exemplified by FIG. 3, the total width of the selected tapes T becomes wide even when the number of the tapes T selected and fed out by the fiber feeding device 1 is not changed. Meanwhile, when the narrow tapes T are supplied to the fiber feeding device 1 as exemplified by FIG. 4, the total width of the selected tapes T becomes narrow even when the number of the tapes T selected and fed out by the fiber feeding device 1 is not changed.

On the other hand, when the number of the tapes T selected by the fiber feeding device 1 is changed, the total width of the selected tapes T changes even when the width of each tape T supplied to the fiber feeding device 1 is not changed. Accordingly, the tape T or the tapes T of a wide variety of total widths can be fed out from the fiber feeding device 1 to the compaction roller 4 by changing both of the width of each tape T supplied to the fiber feeding device 1 and the number of the tapes T selected by the fiber feeding device 1. As a result, the tape T or the tapes T whose total width changes can be laminated, and thereby an FRP having a more complicated form can be mold.

The arrayed tapes T supplied to the fiber feeding device 1 can be produced by the fiber arranging device 6 having desired configuration. For example, interchangeable bobbins 7 of the tapes T each having a specific width may be set as exemplified by FIG. 1 while the tapes T supplied from the bobbins 7 can be disposed in the width direction by the fiber arranging device 6. In this case, the width of each tape T supplied to the fiber feeding device 1 can be changed by exchanging a bobbin 7 for another bobbin 7 of the tape T having a different width.

When width adjusting devices 8 for changing the widths of the tapes T respectively are disposed in the fore stage of the fiber arranging device 6 as exemplified by FIG. 1, not only the widths of the tapes T supplied from the bobbins 7 can be changed to desired widths respectively to be supplied to the fiber feeding device 1, but the widths of the tapes T can be changed during feeding of the tapes T. That is, the tapes T whose widths are not constant can be supplied to the fiber feeding device 1.

As an example of a device for expanding the width of a dry tape, an opening apparatus disclosed by the pamphlet of the international publication No. 2010/137525 is known. In addition, a device, which can narrow the width of not only a dry tape but a prepreg tape, disclosed by Japanese Patent Application Publication JP2020-93454A may be used as the width adjusting device 8.

Therefore, the tapes T having widths different from each other may be arrayed without overlapping the tapes T with each other in the width direction to be supplied to the fiber feeding device 1 although the examples shown in FIG. 3 and FIG. 4 each shows a case where the widths of the tapes T simultaneously supplied to the fiber feeding device 1 are almost same as each other. The tapes T whose widths are not constant may also be supplied to the fiber feeding device 1.

When the total width of the tapes T is narrowed by reducing the number of the tapes T fed out from the fiber feeding device 1, it is necessary to exclude the tape T from the target to be fed out as non-selected tape T in order from the tape T on a lateral side or the tapes T on both lateral sides in order to prevent any non-negligible gap from arising between the tapes T fed out. For example, in each of the examples shown in FIG. 3 and FIG. 4, the sixteen tapes T are selectable while the twelve tapes T on both lateral sides are made non-selected, and thereby the four tapes T closer to the center are selectively fed out. As a matter of course, the total width of the tapes T may be narrowed by making the tape T non-selected in order from one side instead of making the tapes T non-selected in order from both sides.

Not only one tape T is made selectable but a set of tapes T may be made selectable. That is, the tapes T supplied from the fiber arranging device 6 to the fiber feeding device 1 can be divided into groups so that a group including tapes T can be selected.

Henceforth, explanation will often be given for an example of case where the sixteen tapes T supplied from the fiber arranging device 6 to the fiber feeding device 1 are classified into four groups, consisting of the first group having the two tapes TA, the second group having the two tapes TB, the third group having the four tapes TC and the fourth group having the eight tapes TD, from the side close to the center towards both lateral sides, as exemplified by FIG. 2, so that the groups can be selected or non-selected. As a matter of course, a group to which only a single tape T belongs may be made. That is, groups each having at least one tape T can be selected or non-selected, besides the example described below.

The above-mentioned fiber feeding device 1 which feeds out the tapes T selectively can be composed of brakes 9, guide rollers 10, a belt conveyor 11, a roller moving mechanism 12, a cutter 13, an auxiliary roller 14 and a controller 15. The brake 9 and the guide roller 10 are disposed for each selectable group. Therefore, when the tapes T are classified into the four groups of the tapes TA, TB, TC and TD, the four brakes 9A, 9B, 9C and 9D, and the four guide rollers 10A, 10B, 10C and 10D are included in the fiber feeding device 1.

The brake unit consisting of the brakes 9 is configured to stop feeding out of tapes T, belonging to at least one group, whose feeding out should be stopped, if any, out of the arrayed tapes T supplied to the fiber feeding device 1. In the illustrated example, each brake 9 is configured to stop the feeding out of the corresponding tape T by pinching the corresponding tape T between a brake roller 16 and a columnar pressing member 17. Meanwhile, each brake 9 is configured to release the stopping of feeding out of the corresponding tape T by pulling apart the pressing member 17 from the brake roller 16 relatively.

The pressing member 17 may have not only a circular columnar form but a desired form, such as a prismatic columnar form. When the pressing member 17 is composed of a rotatable roller, sudden stopping of the tape T can be avoided.

The pressing member 17 can be moved relatively to the brake roller 16 using a desired driving mechanism. For example, at least one of the pressing member 17 and the brake roller 16 may be reciprocated linearly using a machine element for reciprocating an object linearly like a ball screw, gears, such as a rack-and-pinion, or a cylinder mechanism, such as an air cylinder, a hydraulic cylinder, or an electric cylinder, having a cylinder tube and a piston reciprocated inside the cylinder tube. Alternatively, at least one of the pressing member 17 and the brake roller 16 may be reciprocated along an arc like a pendulum by fixing at least one of the pressing member 17 and the brake roller 16 to one end of a shaft rotated by a gear or a motor, or fixing the columnar pressing member 17, of which the cross section is not circular, to a rotation shaft of a gear or a motor.

The guide roller unit consisting of the guide rollers 10 functions as a guide mechanism which guides feeding out of the arrayed tapes T supplied to the fiber feeding device 1. Each guide roller 10 is configured to approach toward the belt conveyor 11 and to retract from the belt conveyor 11 by driving of the roller moving mechanism 12. Accordingly, each tape T guided by the guide roller 10 which approached the belt conveyor 11 is fed out in a state that the tape T is pinched between the belt conveyor 11 and the guide roller 10 while each tape T guided by the guide roller 10 which retracted from the belt conveyor 11 is not contact with the belt conveyor 11.

Therefore, each guide roller 10 need not have power. Specifically, as long as the guide roller 10 is brought close to the belt conveyor 11 so that the distance between the guide roller 10 and the belt conveyor 11 may become not more than the thickness of the tape T, the tape T is pinched between the belt conveyor 11 and the guide roller 10 with sufficient pressure. Thereby, the power of the belt conveyor 11 is transmitted to the guide roller 10 through the tape T by the frictional force between the tape T and each of the belt conveyor 11 and the guide roller 10. Accordingly, each guide roller 10 can be rotated even when the guide roller 10 is not powered by a motor or the like. Therefore, all the guide rollers 10 can be rotated only by the power of the belt conveyor 11. As a result, the number of power sources, such as motors, required for the fiber feeding device 1 can be reduced.

Nevertheless, each of the guide rollers 10 may be powered by a motor or the like so that each tape T can be fed out by both the guide roller 10 and the belt conveyor 11. That is, each guide roller 10 may be a power roller similar to a feed roller included in the conventional typical AFP apparatus. In that case, each tape T can be fed out with sufficient power, and thereby each tape T can be fed out without any difficulty even under conditions under which large power is required for pulling out the tape T from the fiber arranging device 6.

On the other hand, also when the tape T is guided by the guide roller 10 without bringing the tape T into contact with the belt conveyor 11 by retracting the guide roller 10 from the belt conveyor 11 so that the distance between the guide roller 10 and the belt conveyor 11 may become larger than the thickness of the tape T, the tape T pushed towards the table 3 by the compaction roller 4 can be fed out by moving the compaction roller 4 relatively to the table 3; as mentioned above.

Specifically, as long as the tape T is pushed by the compaction roller 4, the tape T can be fed out since tension acts on the tape T due to the frictional force between the tape T, being fed out and pushed by the compaction roller 4, and each of the compaction roller 4 and the jig J or the tape T laminated on the lower side. In this case, the guide roller 10 retracted from the belt conveyor 11 is also rotated due to the frictional force between the guide roller 10 and the tape T being fed out and pushed by the compaction roller 4.

Therefore, the tape T required to be pinched between the guide roller 10 and the belt conveyor 11 to be fed out is each tape T whose end has not reached the compaction roller 4, out of the tapes T of which feedings are not stopped by the brakes 9.

Note that, each tape T having reached the compaction roller 4 may be pinched between the guide roller 10 and the belt conveyor 11 to be fed out. Nevertheless, not only when the feeding speed of the belt conveyor 11 differs from the relative speed of the compaction roller 4 to the table 3, but when the feeding speeds of the tapes T fed out from the compaction roller 4 differs from each other, slack and excess tension may arise in the tapes T, having reached the compaction roller 4, pinched by the belt conveyor 11 and at least one of the guide rollers 10. Therefore, in such a case, it is appropriate to pinch only tapes T, which have not reached the compaction roller 4, by the belt conveyor 11 and at least one of the guide rollers 10 to be fed out. Conversely, it is appropriate to pull the tapes T, having reached the compaction roller 4, away from the belt conveyor 11 so as not to be powered by the belt conveyor 11.

The roller moving mechanism 12 is configured to move the guide rollers 10 so that at least one target guide roller 10 may approach the belt conveyor 11 or retract from the belt conveyor 11, as mentioned above. The guide roller 10 which should be brought close to the belt conveyor 11 is each guide roller 10 for guiding the tape T whose end has not reached the compaction roller 4, among the tapes T of which feedings are not stopped by the brakes 9, as mentioned above. On the contrary, the guide roller 10 which should be retracted from the belt conveyor 11 is each guide roller 10 for guiding the tape T of which feeding is stopped by the brake 9 or each guide roller 10 for guiding the tape T whose end has reached the compaction roller 4, among the tapes T of which feedings are not stopped by the brakes 9.

Accordingly, whether the guide rollers 10 should be brought close to the belt conveyor 11 or retracted from the belt conveyor 11 are determined based on the operating conditions of the brakes 9 and the positions of the ends of the tapes T respectively. This determination is performed by the controller 15.

Therefore, the roller moving mechanism 12 is configured to bring, close to the belt conveyor 11, at least one guide roller 10 which should be brought close to the belt conveyor 11, selected by the determination in the controller 15, and retract, from the belt conveyor 11, the other guide roller 10 or guide rollers 10 which are not selected by the controller 15. As a matter of course, the determination in the controller 15 may be selecting at least one guide roller 10 which should be retracted from the belt conveyor 11 and making the other guide roller 10 or guide rollers 10 non-selected. This determination is equivalent to the determination for selecting at least one guide roller 10 which should be brought close to the belt conveyor 11.

More specifically, the roller moving mechanism 12 receives control signals from the controller 15. Then, when at least one guide roller 10 which should be brought close to the belt conveyor 11 has been selected, the roller moving mechanism 12 pushes the selected guide roller 10 or guide rollers 10 to the belt conveyor 11 so that the tape T or tapes T guided by the selected guide roller 10 or guide rollers 10, out of all the tapes T may be pinched between the belt conveyor 11 and the selected guide roller 10 or guide rollers 10.

That is, the roller moving mechanism 12 brings the at least one guide roller 10, selected from the guide rollers 10, close to the belt conveyor 11 so that the interval between the at least one selected guide roller 10 and the belt conveyor 11 may become not more than the thickness of each tape T. Thereby, each tape T, of which feeding out is not stopped by the corresponding brake 9, which has not reached the compaction roller 4 can be pinched between the corresponding guide roller 10 and the belt conveyor 11 to be fed out. As a matter of course, all the guide rollers 10 may be selected so that all the tapes T may be pinched between the guide rollers 10 and the belt conveyor 11 to be fed out.

Meanwhile, the roller moving mechanism 12 keeps the other non-selected guide roller 10 or guide rollers 10 retracted from the belt conveyor 11. Specifically, when all the guide rollers 10 are not selected as guide rollers 10 which should be brought close to the belt conveyor 11, and therefore there is non-selected at least one guide roller 10, the roller moving mechanism 12 positions the non-selected at least one guide roller 10 away from the belt conveyor 11 so that at least one tape T guided by the non-selected at least one guide roller 10 may not be pinched between the non-selected at least one guide roller 10 and the belt conveyor 11.

Thereby, each tape T of which feeding is stopped by the corresponding brake 9 is positioned away from the belt conveyor 11 so that power may not be transmitted from the belt conveyor 11, and is kept stopped. In addition, each tape T which has reached the compaction roller 4 is also positioned away from the belt conveyor 11, and thereby is not powered by the belt conveyor 11. Accordingly, each tape T which has reached the compaction roller 4 can be fed out toward the table 3 with a relative speed of the compaction roller 4 to the table 3, which is independent from the conveying speed of the belt conveyor 11. Furthermore, the tapes T which have reached the compaction roller 4 can be fed out with speeds independent from each other.

The roller moving mechanism 12 can be composed of desired driving mechanisms. In the illustrated example, the roller moving mechanism 12 is composed of cylinder mechanisms 12A, such as air cylinders, hydraulic cylinders, or electric cylinders, each having a cylinder tube and a piston reciprocated inside the cylinder tube. That is, the roller moving mechanism 12 is configured to reciprocate the rotation shafts of the guide rollers 10 using the cylinder mechanisms 12A respectively. The roller moving mechanism 12 may also be configured to linearly reciprocate the rotation shafts of the guide rollers 10 toward the belt conveyor 11 using machine elements for linearly reciprocating objects like gears, such as rack-and-pinions, or ball screws.

As another example of configuration of the roller moving mechanism 12, each of the rotation shafts of the guide rollers 10 may be hung by a wire, a chain, or a belt so that the rotation shafts of the guide rollers 10 can be elevated or lowered respectively. Alternatively, each of the rotation shafts of the guide rollers 10 may be supported by a cam so that the rotation shafts of the guide rollers 10 can be elevated or lowered by rotations of the cams respectively. That is, the tapes T may be pushed to the belt conveyor 11 by the weight of the guide rollers 10 respectively as the above-mentioned examples. As still another example, the roller moving mechanism 12 may be configured to reciprocate the rotation shafts of the guide rollers 10 along arcs like pendulums respectively. In that case, the rotation shafts of the guide rollers 10 may be rotatably coupled to the ends of shafts whose inclination angles are changed by gears or motors, respectively, for example.

The belt conveyor 11 is a conveyance device for feeding out at least one tape T guided by at least one guide roller 10, which does not guide the tape T of which feeding should be stopped by the brake 9, selected from all the guide rollers 10 when the at least one guide roller 10 is selected. The at least one tape T to be fed out by the belt conveyor 11 is pinched between the selected at least one guide roller 10 and the belt conveyor 11.

The belt conveyor 11 can be composed of a belt 18, a driving roller 19, pulleys 20, a suction chuck 21 and backup rollers 22. The belt 18 has regularly-disposed many through holes. The driving roller 19 powers and moves the belt 18. The pulleys 20 support the belt 18 so that a track may be formed by the belt 18. The suction chuck 21 sucks air through the holes of the belt 18. The backup rollers 22 support the belt 18 from the inner side of the belt 18. That is, the belt conveyor 11 can include the suction chuck 21 of a vacuum type.

Figure 5:
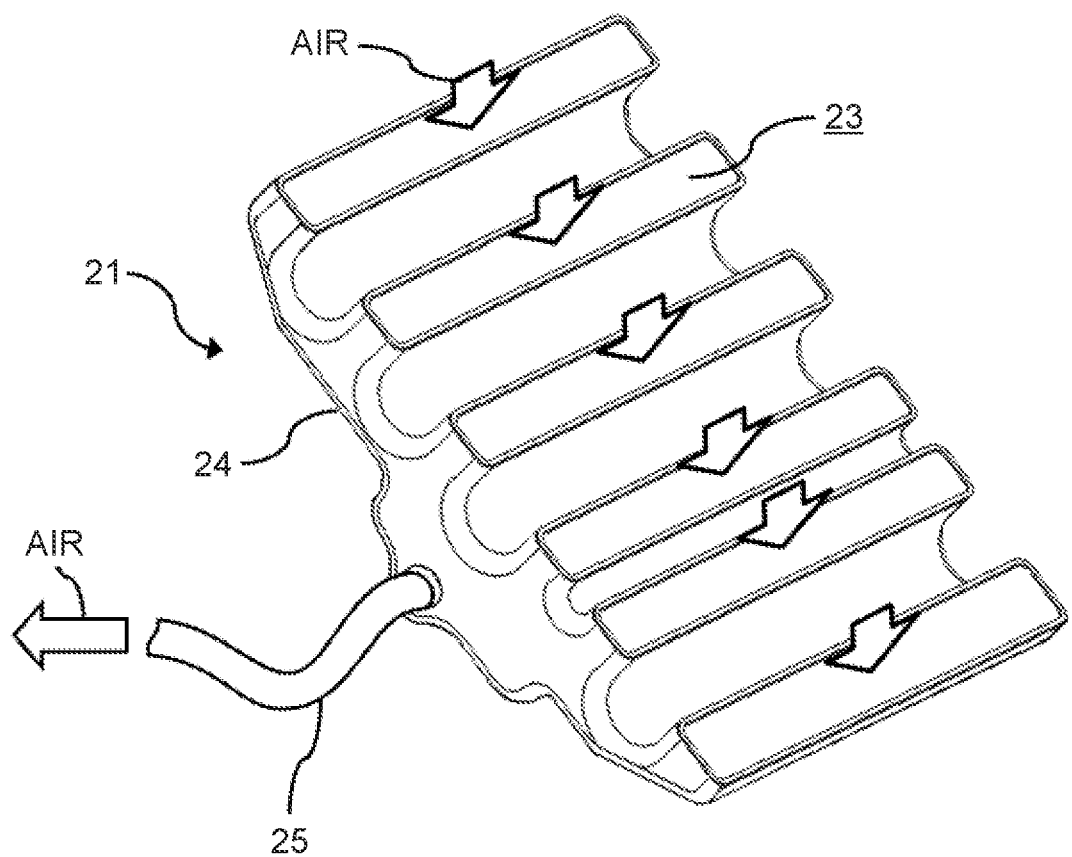
FIG. 5 is a perspective view showing an example of structure of the suction chuck shown in FIG. 1.
Figure 6:
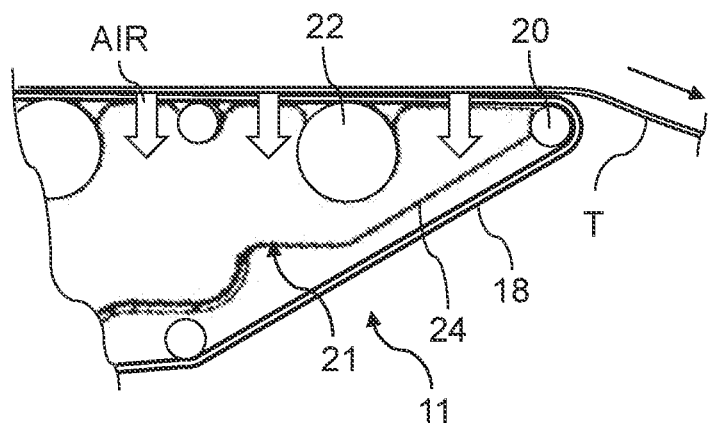
FIG. 6 is a schematic view showing an aspect of feeding out the tapes while sucking the tapes by the suction chuck shown in FIG. 5.

FIG. 5 is a perspective view showing an example of structure of the suction chuck 21 shown in FIG. 1, and FIG. 6 is a schematic view showing an aspect of feeding out the tapes T while sucking the tapes T by the suction chuck 21 shown in FIG. 5.

As exemplified by FIG. 5, a suction box forming negative pressure can be disposed as the suction chuck 21 behind the belt 18 having the holes. In the example shown in FIG. 5, the suction chuck 21 has five suction openings 23, a hollow housing 24 and an exhaust hose 25. The housing 24 has concave portions for disposing the backup rollers 22 and one of the pulleys 20 while the suction openings 23 for vacuum chucking open at portions of the housing 24 other than the concave portions. The exhaust hose 25 is coupled to the housing 24 in order to couple the housing 24 to an ejector.

Accordingly, each tape T pushed on the belt 18 by the corresponding guide roller 10 can be sucked to the belt 18 by the suction chuck 21 sucking air through the holes of the belt 18, as shown in FIG. 6. In this case, each tape T sucked to the belt 18 can be pulled away from the belt 18 after the tape T has passed the suction area by the suction chuck 21. Therefore, it is appropriate to determine the suction area by the suction chuck 21 so that each tape T may smoothly separate from the belt 18 just before the compaction roller 4.

The portions forming the suction openings 23 of the housing 24 have no rigidity except for the edges of the suction openings 23. Therefore, when the guide rollers 10 and the cutter 13 are pressed to the belt 18, the belt 18 may deform to a non-negligible extent at portions distant from the edges of the suction openings 23. Accordingly, when the suction chuck 21 is included in the belt conveyor 11, it is appropriate to dispose the backup rollers 22 at positions behind the belt 18, opposite to the guide rollers 10 and the cutter 13 respectively in order to support the belt 18.

Namely, it is appropriate to support the belt 18 by the backup rollers 22 from the inner side so that the belt 18 may not be dented in the pressing direction of the guide rollers 10 and the cutter 13 even when the guide rollers 10 and the cutter 13 are pressed on the belt 18, and thereby the pressure applied from the guide rollers 10 and the cutter 13 to the belt 18 and the tapes T may not decrease. In this case, each tape T pressed on the belt 18 by the corresponding guide roller 10 is pinched and fed out by the corresponding guide roller 10 and the corresponding backup roller 22 together with the belt 18. In the illustrated example, the driving roller 19 for moving the belt 18 also serves as the backup roller 22.

When the suction chuck 21 having sufficient suction force is included in the belt conveyor 11, not only each tape T pressed on the belt 18 by the guide roller 10 but each tape T guided by the guide roller 10 away from the belt conveyor 11 can be sucked. Accordingly, not only each tape T pressed on the belt 18 by the guide roller 10 but each tape T near the belt 18 can be prevented from deviating in the width direction of the tape T by the suction chuck 21 sucking each tape T.

That is, when the suction chuck 21 having sufficient suction force is included in the belt conveyor 11, the belt conveyor 11 can function as not only a feeding device for conveying the tapes T, of which ends have not reached the compaction roller 4, while sucking the tapes T, but a guide device for preventing all the tapes T guided by the guide rollers 10, including each tape T of which feeding out is stopped by the brake 9, from deviating in the width direction.

In other words, the belt conveyor 11 equipped with the suction chuck 21 functions as a guide device for keeping the intervals of the tapes T arrayed by the fiber arranging device 6. Accordingly, even when the tapes T having various widths are supplied with various intervals from the fiber arranging device 6 to the fiber feeding device 1, a selected part or all of the tapes T can be fed out toward the compaction roller 4 while keeping the intervals of the tapes T determined by the fiber arranging device 6.

Note that, even when the tapes T consist of breathable dry tapes, not only each dry tape pressed on the belt 18 by the guide roller 10 can be vacuum-chucked, but dry tapes including each dry tape away from the belt 18 can be sucked for preventing the dry tapes from deviating in the width direction as long as the suction chuck 21 has the sufficient suction force.

Meanwhile, when the tapes T consist of prepreg tapes, each prepreg tape pressed on the belt 18 by the guide roller 10 adheres to the belt 18 due to the tack even without the vacuum chucking. Accordingly, when a certain degree of deviation of each prepreg tape in the width direction may be accepted, the suction chuck 21 may be omitted. In that case, the belt 18 of the belt conveyor 11 may have no holes.

The cutter 13 is a tool for cutting at least one tape T which has been fed out in a certain ply. As mentioned above, when the suction chuck 21 is included in the belt conveyor 11, it is appropriate to dispose the backup roller 22, for supporting the belt 18, at the position behind the belt 18, corresponding to the cutter 13 so that the belt 18 may not deform even when the cutter 13 is pressed on the belt 18.

In the illustrated example, the single cutter 13 is common to all the tapes T. As a matter of course, the cutter 13 may be disposed for each group. When the cutter 13 is disposed for each group, the number of the tapes T to be laminated in a same ply can be changed without cutting all the tapes T. The cutting edge formed on the tip of the cutter 13 may be reciprocated linearly or along an arc.

The auxiliary roller 14 is disposed in order to change the feeding direction of the tapes T while keeping the tension of the tapes T, as needed. In the illustrated example, the auxiliary roller 14 is disposed in front of the fiber feeding device 1 in order to direct the feeding direction of the tapes T supplied from the fiber arranging device 6 to the brake rollers 16 of the brakes 9.

The controller 15 integrally controls the fiber feeding device 1. Typical control targets in the fiber feeding device 1 are switching of ON/OFF of each brake 9, movement of each guide roller 10 by driving the roller moving mechanism 12, operation of the cutter 13, and actuation of the belt conveyor 11 and the suction chuck 21.

Accordingly, the controller 15 has a function to store an integral control program for integrally controlling these control targets, and to control the respective control targets according to the stored integral control program. That is, the controller 15 has a function to output control signals to each control target according to the integral control program. As a matter of course, the controller 15 may be configured to bi-directionally communicate with each control target so that the controller 15 can recognize the operation mode and the like of each control target.

As mentioned above, whether each guide roller 10 should be moved in the direction approaching the belt conveyor 11 or the direction away from the belt conveyor 11 is determined based on whether the brake 9 corresponding to the tape T guided by the guide roller 10 is in the ON state or the OFF state as well as whether the tape T guided by the guide roller 10 has reached the compaction roller 4.

Whether the tape T guided by each guide roller 10 has reached the compaction roller 4 can be determined based on an elapsed time from a desired trigger signal, such as an elapsed time after switching the corresponding brake 9 off or an elapsed time after pinching the tape T by the guide roller 10 and the belt conveyor 11. In that case, the controller 15 can automatically determine whether the tape T guided by each guide roller 10 has reached the compaction roller 4, with reference to the control program.

Alternatively, the feeding length of each tape T may be measured, and whether the tape T guided by each guide roller 10 has reached the compaction roller 4 may be automatically determined base on the feeding length of the corresponding tape T. In that case, a function to acquire the feeding length of each tape T from a controller of the bobbins 7, the fiber arranging device 6 or the width adjusting devices 8, or a function to acquire the feeding length of each tape T from the belt conveyor 11 as a rotation amount of a motor for rotating the driving roller 19 can be provided with the controller 15 so that the controller 15 can determine whether each tape T has reached the compaction roller 4, based on the feeding length of the corresponding tape T. Otherwise, sensors including rollers or the like for detecting the feeding lengths of the tapes T respectively may be disposed at desired positions so that the controller 15 can acquire the feeding lengths of the tapes T from the sensors respectively.

At the time when the end of the tape T guided by each guide roller 10 reaches the compaction roller 4, it is necessary to move the compaction roller 4 to apply pressure on the tape T. On the contrary, at the time when at least one tape T has been laminated in each ply, and therefore the at least one tape T is cut by the cutter 13, it is appropriate to operate the brake 9 or the brakes 9 to stop the feeding out of the at least one tape T to be cut.

Accordingly, a function to acquire necessary information from the control unit 5A of the moving mechanism 5 which moves the compaction roller 4 relatively to the table 3 can be provided with the controller 15 so that the fiber feeding device 1 may interlock with the moving mechanism 5. Conversely, the controller 15 of the fiber feeding device 1 may be a part of the control unit 5A which controls the moving mechanism 5 so that the controller 15 can bi-directionally communicate with the control unit 5A since the fiber feeding device 1 itself could be built in the lamination head of the AFP apparatus 2.

Next, a concrete example of controlling the fiber feeding device 1 by the controller 15 will be described.

Figures 7, 8:
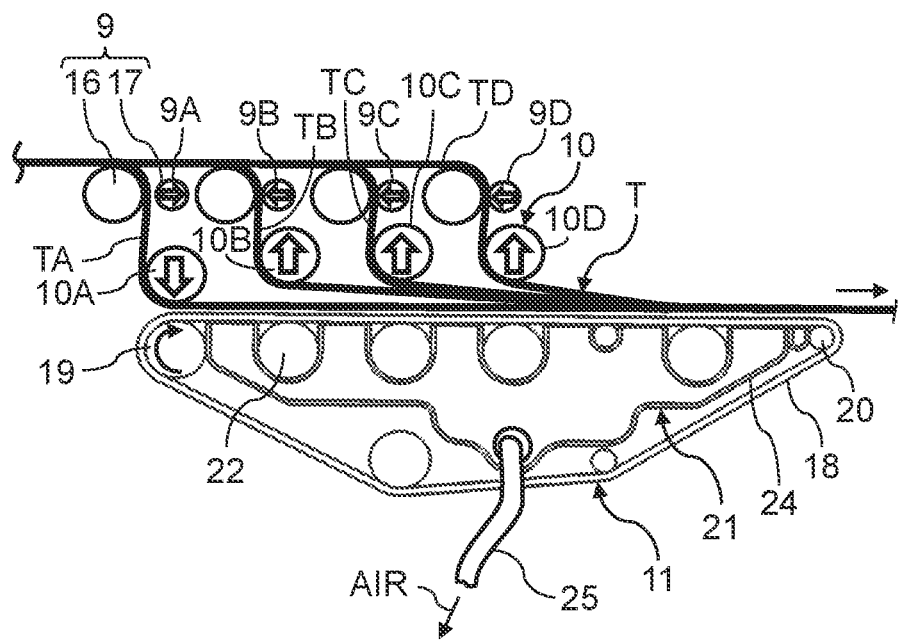
FIG. 7 shows an example of control signals output from the controller in case of feeding out only the two tapes, belonging to the first group shown in FIG. 1, from the fiber feeding device to the compaction roller.
FIG. 8 is a schematic view showing a state of the fiber feeding device controlled by the control signals shown in FIG. 7.

FIG. 7 shows an example of control signals output from the controller 15 in case of feeding out only the two tapes TA, belonging to the first group shown in FIG. 1, from the fiber feeding device 1 to the compaction roller 4. FIG. 8 is a schematic view showing a state of the fiber feeding device 1 controlled by the control signals shown in FIG. 7.

For example, in case of feeding out only the two tapes TA belonging to the first group shown in FIG. 1 from the fiber feeding device 1 to the compaction roller 4, the control signals shown in FIG. 7 can be generated by the controller 15, and output to the brakes 9 and the roller moving mechanism 12.

Specifically, as shown in FIG. 7, the control signal for switching the operating mode off can be output to each of the brakes 9A for stopping the movement of the tapes TA belonging to the first group while the control signal for switching the operating mode on can be output to each of the brakes 9B, 9C and 9D for stopping the movement of the remaining tapes TB, TC and TD belonging to the second to the fourth groups. Thereby, as shown in FIG. 8, only the tapes TA belonging to the first group to which the brakes 9A do not work are fed out while the tapes TB, TC and TD belonging to the second to the fourth groups stop by the operation of the brakes 9B, 9C and 9D.

In addition, the control signals shown in FIG. 7 can be output from the controller 15 to the roller moving mechanism 12 so that the guide roller 10A for guiding the tapes TA belonging to the first group may activate the operation for pushing the tapes TA belonging to the first group on the belt conveyor 11 while the remaining guide rollers 10B, 10C and 10D for guiding the remaining tapes TB, TC and TD belonging to the second to the fourth groups may not activate the operation for pushing the remaining tapes TB, TC and TD belonging to the second to the fourth groups on the belt conveyor 11 respectively.

Thereby, the roller moving mechanism 12 drives, and only the guide roller 10A for guiding the tapes TA belonging to the first group is brought close to the belt conveyor 11, as shown in FIG. 8. Therefore, only the tapes TA belonging to the first group are pinched by the guide roller 10A and the belt conveyor 11 supported by the backup roller 22 which doubles the driving roller 19. As a result, only the tapes TA belonging to the first group before reaching the compaction roller 4 can be fed out toward the compaction roller 4 by the power of the belt conveyor 11.

Meanwhile, since the guide rollers 10B, 10C and 10D for guiding the tapes TB, TC and TD belonging to the second to the fourth groups do not push the tapes TB, TC and TD belonging to the second to the fourth groups on the belt conveyor 11 respectively, the tapes TB, TC and TD belonging to the second to the fourth groups are not powered by the belt conveyor 11. Therefore, excess tension does not arise in each of the tapes TB, TC and TD, belonging to the second to the fourth groups, of which the movement has been stopped by the brakes 9B, 9C and 9D respectively.

Figures 9, 10:
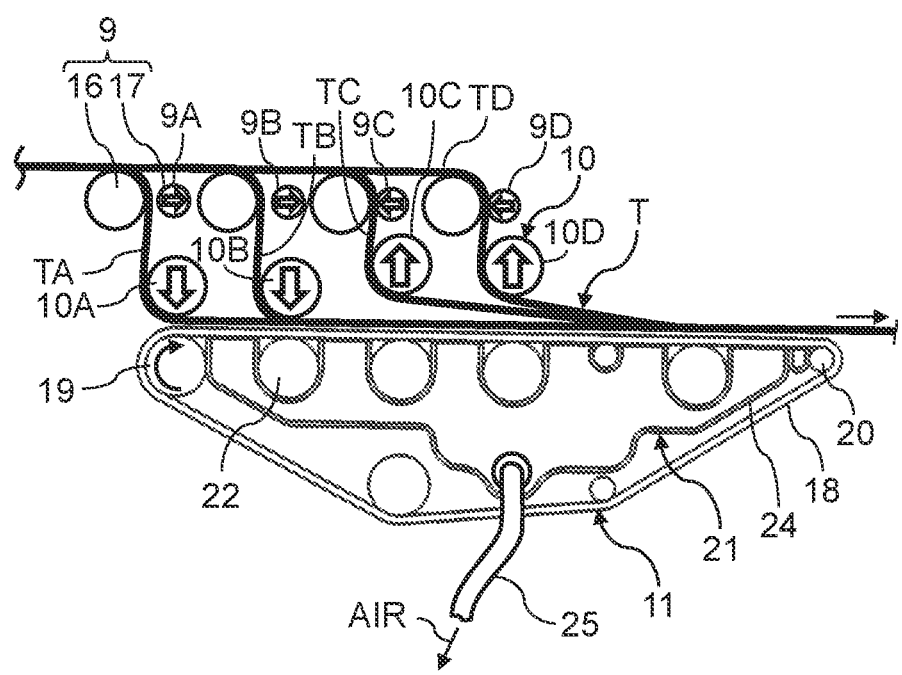
FIG. 9 shows an example of control signals output from the controller in case of feeding out only the two tapes, belonging to the first group shown in FIG. 1, and the two tapes, belonging to the second group, from the fiber feeding device to the compaction roller.
FIG. 10 is a schematic view showing a state of the fiber feeding device controlled by the control signals shown in FIG. 9.

FIG. 9 shows an example of control signals output from the controller 15 in case of feeding out only the two tapes TA, belonging to the first group shown in FIG. 1, and the two tapes TB, belonging to the second group, from the fiber feeding device 1 to the compaction roller 4. FIG. 10 is a schematic view showing a state of the fiber feeding device 1 controlled by the control signals shown in FIG. 9.

In case of feeding out only the two tapes TA belonging to the first group and the two tapes TB belonging to the second group as shown in FIG. 1 from the fiber feeding device 1 to the compaction roller 4, the control signals shown in FIG. 9 can be generated by the controller 15, and output to the brakes 9 and the roller moving mechanism 12.

Specifically, as shown in FIG. 9, the control signal for switching the operating mode off can be output to each of the brakes 9A for stopping the movement of the tapes TA belonging to the first group and the brakes 9B for stopping the movement of the tapes TB belonging to the second group while the control signal for switching the operating mode on can be output to each of the brakes 9C and 9D for stopping the movement of the remaining tapes TC and TD belonging to the third and fourth groups. Thereby, as shown in FIG. 10, only the tapes TA belonging to the first group and the tapes TB belonging to the second group to which the brakes 9A and 9B do not work are fed out while the tapes TC and TD belonging to the third and fourth groups stop by the operation of the brakes 9C and 9D.

In addition, the control signals shown in FIG. 9 can be output from the controller 15 to the roller moving mechanism 12 so that the guide rollers 10A and 10B for guiding the tapes TA and TB belonging to the first and second groups may activate the operation for pushing the tapes TA and TB belonging to the first and second groups on the belt conveyor 11 respectively while the remaining guide rollers 10C and 10D for guiding the remaining tapes TC and TD belonging to the third and fourth groups may not activate the operation for pushing the remaining tapes TC and TD belonging to the third and fourth groups on the belt conveyor 11 respectively.

Thereby, the roller moving mechanism 12 drives, and only the guide rollers 10A and 10B for guiding the tapes TA and TB belonging to the first and second groups respectively are brought close to the belt conveyor 11, as shown in FIG. 10. Therefore, only the tapes TA and TB belonging to the first and second groups are pinched by the guide rollers 10A and 10B, and the belt conveyor 11 supported by the backup rollers 22 respectively. As a result, only the tapes TA and TB belonging to the first and second groups before reaching the compaction roller 4 can be fed out toward the compaction roller 4 by the power of the belt conveyor 11 respectively.

Meanwhile, since the guide rollers 10C and 10D for guiding the tapes TC and TD belonging to the third and fourth groups do not push the tapes TC and TD belonging to the third and fourth groups on the belt conveyor 11 respectively, the tapes TC and TD belonging to the third and fourth groups are not powered by the belt conveyor 11. Therefore, excess tension does not arise in each of the tapes TC and TD, belonging to the third and fourth groups, of which the movement has been stopped by the brakes 9C and 9D respectively.

As the examples shown in FIG. 7 to FIG. 10, tapes T belonging to at least one desired group can be selected from the tapes TA, TB, TC and TD belonging to the groups, to be fed out towards the compaction roller 4, by the control of the brakes 9A, 9B, 9C and 9D, and the guide rollers 10A, 10B, 10C and 10D interlocked with each other by the controller 15. In other words, the number of the tapes T simultaneously fed out towards the compaction roller 4 can be changed.

As mentioned above, once the tapes T fed out from the fiber feeding device 1 have reached the compaction roller 4, it is appropriate to pull apart the tapes T from the belt conveyor 11 since the feeding speeds of the tapes T are fixed according to the relative speed of the compaction roller 4 to the table 3. Accordingly, it is necessary to control the fiber feeding device 1 by the controller 15 in which the control program has been installed also after the tapes T fed out from the fiber feeding device 1 have reached the compaction roller 4.

FIG. 11 shows an example of control states of the AFP apparatus 2 including the fiber feeding device 1 in case of laminating one ply by feeding out only the two tapes TA, belonging to the first group shown in FIG. 1, and the two tapes TB, belonging to the second group, from the fiber feeding device 1 to the compaction roller 4.

As shown in FIG. 11, in the initial state of the AFP apparatus 2 including the fiber feeding device 1, all the brakes 9A, 9B, 9C and 9D are made the ON states so that any of the tapes TA, TB, TC and TD belonging to all the groups may not be fed out. Meanwhile, the pressurization by each of the guide rollers 10A, 10B, 10C and 10D, the cutter 13, and the compaction roller 4 is made the OFF state.

When only the tapes TA and TB belonging to the first and second groups are fed out, the brakes 9A and 9B for stopping the movement of the tapes TA and TB belonging to the first and second groups respectively are switched off under the control by the controller 15 while the press operation onto the belt conveyor 11 of the tapes TA and TB belonging to the first and second groups by the guide rollers 10A and 10B for guiding the tapes TA and TB respectively is switched on under the control by the controller 15, as explained with reference to FIG. 9 and FIG. 10. Thereby, the ends of the tapes TA and TB belonging to the first and second groups are powered by the belt conveyor 11 supported by the backup rollers 22, to be fed out to the compaction roller 4.

When the ends of the tapes TA and TB belonging to the first and second groups reached the compaction roller 4, the press operation onto the belt conveyor 11 of the tapes TA and TB belonging to the first and second groups by the guide rollers 10A and 10B for guiding the tapes TA and TB respectively is switched off under the control by the controller 15.

Meanwhile, the moving mechanism 5 of the AFP apparatus 2 moves the compaction roller 4 relatively to the table 3 in the thickness direction of the tapes TA and TB under the control by the control unit 5A interlocking with the controller 15 of the fiber feeding device 1. Accordingly, pressure is applied on the tapes TA and TB from the compaction roller 4. That is, the pressurization on the tapes TA and TB by the compaction roller 4 is switched on.

Thereby, the power given from the belt conveyor 11 to the tapes TA and TB belonging to the first and second groups is intercepted while tension is applied from the compaction roller 4 to the tapes TA and TB belonging to the first and second groups. Then, the tapes TA and TB can be laminated on the table 3 by moving the compaction roller 4 relatively to the table 3 in the length direction of the tapes TA and TB. Since the tapes TA and TB are fed out from the AFP apparatus 2 with speeds independent from each other by the tension received from the compaction roller 4, the tapes TA and TB can also be fed out along a curved line.

When the tapes TA and TB reach the end of a lamination area, the relative movement of the compaction roller 4 to the table 3 by the driving of the moving mechanism 5 is stopped. Meanwhile, the brakes 9A and 9B for stopping the movement of the tapes TA and TB belonging to the first and second groups respectively are almost simultaneously switched on under the control by the controller 15. Thereby, the movement of the tapes TA and TB belonging to the first and second groups is stopped.

In addition, the control signal for switching the operating state to the ON state is output from the controller 15 to the cutter 13. Thereby, the cutter 13 is activated, and the tapes TA and TB belonging to the first and second groups are cut.

When the tapes TA and TB have been cut, the control signal for switching the operating state to the OFF state is output from the controller 15 to the cutter 13. Thereby, the cutter 13 is driven, and the cutting edge of the cutter 13 is retracted from the tapes TA and TB belonging to the first and second groups.

After that, the moving mechanism 5 moves the compaction roller 4 relatively to the table 3 in the thickness direction of the tapes TA and TB, and thereby the pressurization by the compaction roller 4 onto the tapes TA and TB is turned off. That is, the compaction roller 4 is pulled apart from the tapes TA and TB. Thereby, the lamination of the tapes TA and TB for one ply has been completed, and the AFP apparatus 2 including the fiber feeding device 1 returns to the initial state.

By installing such a control program as described above in the controller 15, selection, feeding out and lamination of the tapes T can be repeated according to the form of an FRP to be produced. Thereby, a laminated body of the tapes T consisting of prepreg tapes or dry tapes can be produced as a material of an FRP.

While all the guide rollers 10 have been pulled apart from the belt conveyor 11, the belt 18 may be stopped to move. That is, the movement of the belt 18 may be interlocked with the control of the guide rollers 10 and the roller moving mechanism 12. On the contrary, while at least one tape T is being fed out from the compaction roller 4, the belt 18 of the belt conveyor 11 may not be stopped to move since unnecessary frictional force between the belt 18 and the at least one tape T can be reduced as long as the at least one tape T may contact with the belt 18 near the compaction roller 4 even when the at least one tape T is being guided by the guide roller 10 away from the belt conveyor 11. Therefore, control signals for switching the operational mode of the belt conveyor 11 between the ON mode and the OFF mode are output from the controller 15 to the driving roller 19 of the belt conveyor 11 at appropriate timing.

While all the guide rollers 10 have been pulled apart from the belt conveyor 11, the suction chuck 21 may be turned off by controlling the suction chuck 21 by the controller 15. Nevertheless, while at least one tape T is being fed out from the compaction roller 4, the suction chuck 21 may be kept in the ON state since deviation of the at least one tape T in the width direction can be prevented by sucking the at least one tape T, being fed out, by the suction chuck 21, as mentioned above.

(A Method of Laminating Fibers and a Method of Molding a Composite Material)

Next, a method of laminating fibers and a method of molding a composite material using the AFP apparatus 2 including the fiber feeding device 1 will be described.

Figure 12:
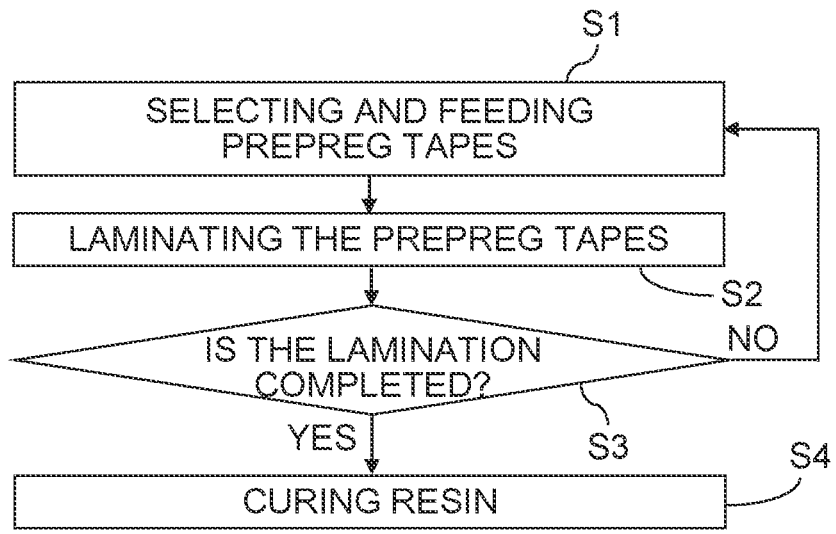
FIG. 12 is a flow chart showing an example of a flow for molding an FRP with material consisting of prepreg tapes using the AFP apparatus including the fiber feeding device shown in FIG. 1.

FIG. 12 is a flow chart showing an example of a flow for molding an FRP with material consisting of prepreg tapes using the AFP apparatus 2 including the fiber feeding device 1 shown in FIG. 1.

First, in step S1, at least one tape T to be laminated is selected from the tapes T and the selected least one tape T is fed out, in the fiber feeding device 1.

Specifically, the tapes T, consisting of prepreg tapes, previously arrayed by the fiber arranging device 6 are supplied to the fiber feeding device 1. Then, the controller 15 controls the brakes 9 and the roller moving mechanism 12 according to a control program so that the movement of the tape T or the tapes T which should not be laminated may be stopped by the brake 9 or the brakes 9 while only the tape T or the tapes T to be laminated may be pinched between at least one guide roller 10 and the belt conveyor 11 with the suction chuck 21, and fed out to the compaction roller 4, like the examples shown in FIG. 7 to FIG. 10. Thereby, only the single tape T or the tapes T selected as laminating target or laminating targets from the tapes T arrayed by the fiber arranging device 6 are fed out towards the compaction roller 4.

Next, in step S2, the single tape T or tapes T fed out from the fiber feeding device 1 to the compaction roller 4 are laminated.

Specifically, when the end of the tape T or the ends of the tapes T fed out from the fiber feeding device 1 to the compaction roller 4 have reached the compaction roller 4, the guide roller 10 or the guide rollers 10 which guide the tape T or the tapes T fed out to the compaction roller 4 are retracted from the belt conveyor 11 under the control by the controller 15 while the compaction roller 4 approaches the table 3 by driving of the moving mechanism 5 controlled by the control unit 5A interlocked with the controller 15. As a result, the tape T or the tapes T fed out to the compaction roller 4 are pressurized from the compaction roller 4, and tension arises due to frictional force between the compaction roller 4 and the tape T or the tapes T.

Then, the compaction roller 4 is moved relatively to the table 3, in the direction opposite to the feeding direction of the tape T or the tapes T, by driving of the moving mechanism 5 controlled by the control unit 5A. Thereby, the tape T or the tapes T pushed onto the table 3 side by the compaction roller 4 are fed out in the direction opposite to the moving direction of the compaction roller 4.

The compaction roller 4 can be not only moved linearly but rotated to the table 3. When the tapes T are fed out, the tapes T do not overlap with each other in the width direction, and therefore the tack of prepreg does not act between each adjacent tapes T. Accordingly, each tape T can be fed out with a feeding speed and a feeding length independent from those of another tape T. As a result, even when the compaction roller 4 is moved along a curved line, each tape T can be fed out without slack, excess tension and the like.

When the tape T or the tapes T fed out from the compaction roller 4 reach the end of a laminating target area, the compaction roller 4 is stopped to move relatively to the table 3, and then the tape T or the tapes T fed out from the compaction roller 4 are cut by the cutter 13. Thereby, the lamination of the tape T or the tapes T for one ply has been completed.

After that, the selection and feeding out of at least one tape T to be laminated in step S1, and the lamination of the selected at least one tape T in step S2 are repeated until it is determined that the lamination of the tapes T belonging to all the plies has been completed, in step S3. The determination whether the lamination of the tapes T belonging to all the plies has been completed can be automatically performed by the control unit 5A of the moving mechanism 5 and the controller 15 of the fiber feeding device 1, which interlock with each other through intercommunication, based on control programs.

Note that, the tape T or the tapes T fed out to the table 3 first are laminated on the table 3 directly or the jig J, such as a mold, placed on the table 3 for laminating the tapes T while the tape T or the tapes T fed out to the table 3 afterward are sequentially laminated on the tape T or the tapes T adjacent downward.

When the lamination of the tapes T belonging to all the plies has been completed, a laminated body of the tapes T consisting of prepreg tapes is obtained. That is, the laminated body of the tapes T can be produced by laminating each tape T or tapes T for one ply, selected by the fiber feeding device 1, in the ply direction by the AFP apparatus 2.

Next, in step S4, the resin included in the laminated body of the tapes T is cured. Thereby, an FRP can be molded. That is, the FRP which is also referred to as a composite material can be molded using the laminated body of the tapes T produced by the AFP apparatus 2.

When the resin is thermosetting, the resin can be cured by heating the resin with a heater, such as an autoclave apparatus or an oven. Meanwhile, when the resin is thermoplastic, the resin previously melted by heating can be cured by air cooling or cooling with a chiller.

When the resin is cured, the laminated body of the tapes T may be transferred from the jig J for lamination to a molding jig. Alternatively, the jig J for lamination may also be used for curing the resin. Generally, it is necessary for curing the resin to pressurize the laminated body of the tapes T also from above. Accordingly, the laminated body of the tapes T may be pressurized by an upper mold. Alternatively, the atmospheric pressure may be applied on the laminated body of the tapes T by bagging including vacuuming. Note that, at least one device, such as an upper mold, a vacuum device, and a heater or a chiller, necessary for molding the FRP may be integrated with the AFP apparatus 2.

Figure 13:
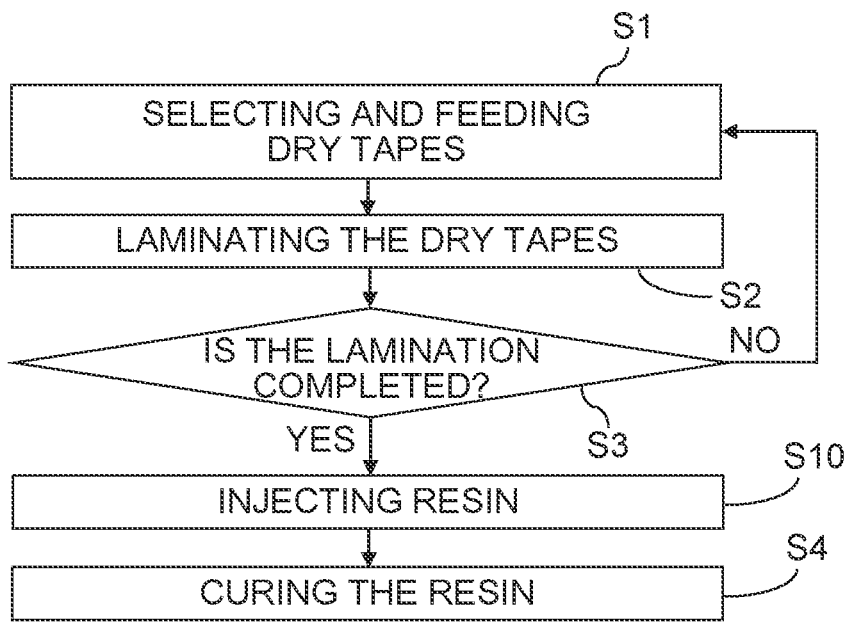
FIG. 13 is a flow chart showing an example of a flow for molding an FRP with material consisting of dry tapes using the AFP apparatus including the fiber feeding device shown in FIG. 1.

FIG. 13 is a flow chart showing an example of a flow for molding an FRP with material consisting of dry tapes using the AFP apparatus 2 including the fiber feeding device 1 shown in FIG. 1. Note that, the steps in FIG. 13 similar to those in FIG. 12 except for whether the tapes T are dry tapes or prepreg tapes are denoted with the same signs, and detailed explanation thereof is omitted.

Dry tapes may be objects of the selection by the fiber feeding device 1 and the lamination by the AFP apparatus 2 or another dedicated lamination apparatus. In that case, when it is determined that the lamination of the tapes T belonging to all the plies has been completed, in step S3, a laminated body of the tapes T consisting of the dry tapes is obtained.

Accordingly, in step S10, resin is injected into the laminated body of the tapes T. For that purpose, the laminated body of the tapes T is seal by a mold, or the laminated body of the tapes T is bagged with vacuuming. Then, in step S4, an FRP is molded by curing the resin with which the laminated tapes T have been impregnated.

Effects

As described above, the fiber feeding device 1, the method of laminating the fibers, and the method of molding the composite material select at least one desired tape T from previously arrayed tapes T consisting of prepreg tapes or dry tapes, and laminate the selected tape T or tapes T.

Accordingly, according to the fiber feeding device 1, the method of laminating the fibers, and the method of molding the composite material, the number of the tapes T laminated simultaneously can be changed. In addition, the width of each tape T itself can also be changed since the arrayed tapes T can be pushed by the single and common compaction roller 4. As a result, the total width of at least one tape T simultaneously fed out from the fiber feeding device 1 to a same ply can be easily changed.

When the suction chuck 21 is provided with the belt conveyor 11, the intervals (pitches) of the tapes T arrayed by the fiber arranging device 6 can be kept so that the tapes T can be prevented from overlapping with each other more certainly. Accordingly, a feeding speed and feeding length can be changed between each tapes T adjacent in the width direction in a same ply. Consequently, the tapes T can be laminated curvedly without excess tension, slack and the like in the tapes T. As a result, it becomes possible to mold an FRP having a more complicated form.

Moreover, it is not necessary to prepare a compaction roller for every tape T since the single tape T or the arrayed tapes T are fed out from the fiber feeding device 1 to the compaction roller 4 of the AFP apparatus 2. Accordingly, there is no interference between parts which conventionally arises due to preparing compaction rollers corresponding to tapes, and thereby it also becomes unnecessary to feed out tapes alternately like a conventional AFP apparatus.

That is, since it is not necessary to provide the AFP apparatus 2 with lamination heads including compaction rollers corresponding to tapes T, it is unnecessary to prepare a complicated mechanism for sliding lamination heads in the width direction of the tapes T even when the widths and the number of the tapes T are changed. Accordingly, it becomes possible to laminate many tapes T, of which the number and widths could be changed, without making the lamination head of the AFP apparatus 2 complicated and large-scale.

Moreover, the fiber feeding device 1 can power the tapes T, which could be fed out, at different positions by the single and common belt conveyor 11. Accordingly, it becomes unnecessary to prepare motors for powering the guide rollers 10, to which rotation power is transmitted from the belt conveyor 11 through the tapes T, and thereby the number of necessary power sources can be reduced.

(Second Implementation)

Figure 14:
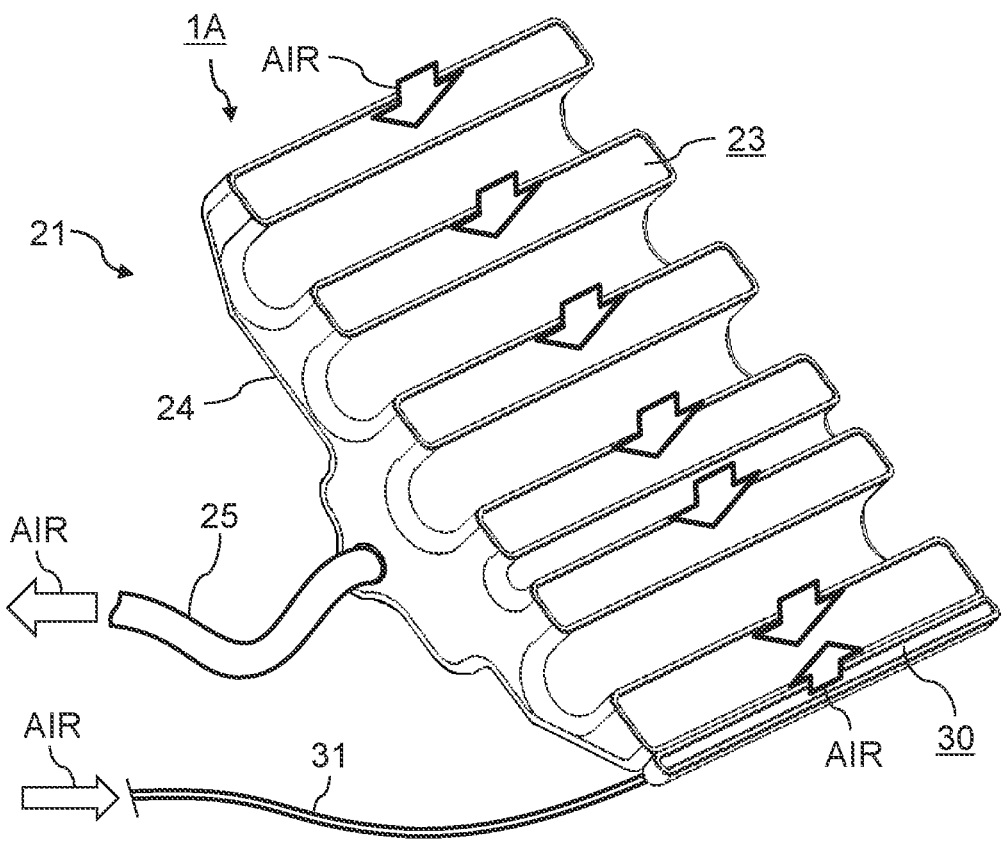
FIG. 14 is a perspective view showing structure of a suction chuck included in a fiber feeding device according to the second implementation of the present invention.

FIG. 14 is a perspective view showing structure of a suction chuck included in a fiber feeding device according to the second implementation of the present invention.

A fiber feeding device 1A in the second implementation shown in FIG. 14 is different from the fiber feeding device 1 in the first implementation in the feature that an air blowing port 30 for discharging air through the holes of the belt 18 is formed at an end portion of the suction chuck 21 included in the belt conveyor 11. Other configuration and actions of the fiber feeding device 1A in the second implementation do not substantially differ from those of the fiber feeding device 1 in the first implementation. Therefore, only an example of structure of the suction chuck 21 is illustrated, and the same signs are attached to the same elements and the corresponding elements while explanation thereof is omitted.

As shown in FIG. 14, the air blowing port 30 can be formed in the end portion on the compaction roller 4 side of the suction chuck 21. More specifically, the air blowing port 30 can be formed at a position at which the tapes T sucked to the belt 18 by the suction chuck 21 should be pulled apart from the belt 18 in order to feed out the tapes T toward the compaction roller 4.

In this case, the inside of the housing 24 included in the suction chuck 21 is segmented to an area for sucking air through the suction openings 23, and an area for discharging air through the air blowing port 30. The exhaust hose 25 for discharging air is coupled to the area for sucking air through the suction openings 23 while an air supply hose 31 for supplying air is coupled to the area for discharging air through the air blowing port 30.

Figure 15:
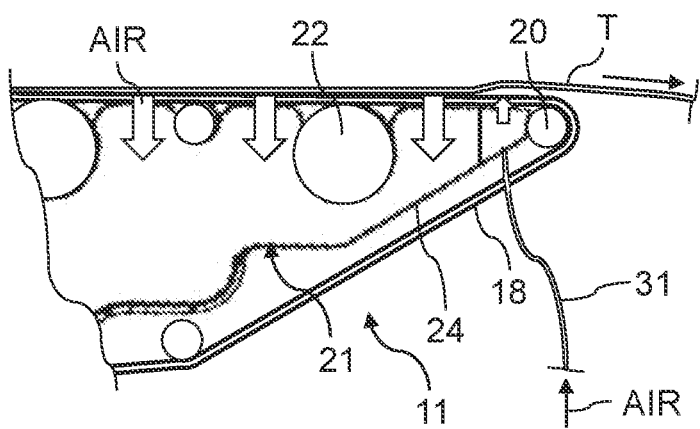
FIG. 15 is a schematic view showing an aspect of feeding out the tapes while sucking the tapes by the suction chuck shown in FIG. 14.

FIG. 15 is a schematic view showing an aspect of feeding out the tapes T while sucking the tapes T by the suction chuck 21 shown in FIG. 14.

As exemplified by FIG. 14, when air is discharged from the air blowing port 30 formed on the compaction roller 4 side of the suction chuck 21, air blow can be performed to the tapes T through the holes of the belt 18. As a result, as shown in FIG. 15, the tapes T suck to the belt 18 by suction of air from the suction openings 23 through the holes of the belt 18 can be pulled apart from the belt 18 at the position at which the air blowing port 30 is formed. That is, trouble that the tapes T are not pulled apart from the belt 18 due to the suction of the tapes T to the belt 18 can be avoided by the air blow to only the portions of the tapes T passing the end portion on the compaction roller 4 side of the belt 18.

According to the above-mentioned second implementation, an effect that the tapes T can be pulled apart from the belt conveyor 11 with the suction chuck 21 at appropriate positions, and thereby the tapes T can be stably fed out to the compaction roller 4 can be attained in addition to effects similar to those in the first implementation.

In particular, a prepreg tape has tack, and therefore forming the air blowing port 30 for air blow in the end portion on the compaction roller 4 side provides a benefit even when the tapes T are fed out by the simple belt conveyor 11 from which the suction chuck 21 has been omitted. Nevertheless, the air blow needs the holes of the belt 18. Therefore, in case of performing air blow through the holes of the belt 18, it is reasonable to also perform vacuum chucking by the suction chuck 21.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A fiber feeding device comprising:
rollers for guiding feeding out of tapes each made of fiber or prepreg, the tapes being arrayed without overlapping the tapes with each other in a width direction;

at least one brake for stopping first feeding out of at least one first tape out of the tapes when the at least one first tape of which the first feeding out should be stopped is designated; and a belt conveyor for second feeding out of at least one second tape selected out of the tapes when at least one roller which does not guide the at least one first tape is selected from the rollers, the at least one second tape being guided by the at least one selected roller, the at least one second tape being fed out by being sandwiched between the at least one selected roller and the belt conveyor, wherein the at least one selected roller approaches the belt conveyor to sandwich the at least one second tape between the at least one selected roller and the belt conveyor while at least one roller nonselected from the rollers retreats from the belt conveyor to prevent at least one third tape out of the tapes from being sandwiched between the at least one nonselected roller and the belt conveyor, the at least one third tape being guided by the at least one nonselected roller, the at least one third tape including the at least one first tape.

2. The fiber feeding device according to claim 1,
wherein the belt conveyor includes:
a belt having holes; and
a suction chuck sucking air through the holes of the belt,
wherein the suction chuck sucks the at least one second tape to prevent the at least one second tape from being misaligned in a width direction of the at least one second tape.

3. A method of laminating fibers comprising:
producing a tape laminated body by laminating the tape fed out by the fiber feeding device according to claim 2.

4. A method of molding a composite material comprising:
molding the composite material using the tape laminated body produced by the method according to claim 3.

5. The fiber feeding device according to claim 1,
wherein the belt conveyor includes:
a belt having holes; and an air blowing port for discharging air through the holes of the belt,
wherein the air blowing port discharges the air to separate the at least one second tape, received by the belt, away from the belt.

6. A method of laminating fibers comprising:
producing a tape laminated body by laminating the tape fed out by the fiber feeding device according to claim 5.

7. A method of molding a composite material comprising:
molding the composite material using the tape laminated body produced by the method according to claim 6.

8. A method of laminating fibers comprising:
producing a tape laminated body by laminating the tape fed out by the fiber feeding device according to claim 1.

9. A method of molding a composite material comprising:
molding the composite material using the tape laminated body produced by the method according to claim 8.

10. The fiber feeding device according to claim 1,
wherein the belt conveyor includes:
a belt having holes;
a suction chuck sucking first air through the holes of the belt; and
an air blowing port for discharging second air through the holes of the belt,
wherein the suction chuck sucks the at least one second tape to prevent the at least one second tape from being misaligned in a width direction of the at least one second tape, and
wherein the air blowing port discharges the second air to separate the at least one second tape away from the belt.

11. A method of laminating fibers comprising:
producing a tape laminated body by laminating the tape fed out by the fiber feeding device according to claim 10.

12. A method of molding a composite material comprising:
molding the composite material using the tape laminated body produced by the method according to claim 11.

* * * * *